United States Patent
Postma

(10) Patent No.: US 6,459,240 B2
(45) Date of Patent: Oct. 1, 2002

(54) BATTERY-POWERED APPARATUS HAVING DETECTION MEANS FOR THE DISCHARGE CONDITION OF THE BATTERY

(75) Inventor: Jan Postma, Drachten (NL)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/828,088

(22) Filed: Apr. 6, 2001

(30) Foreign Application Priority Data

Apr. 10, 2000 (EP) .............................................. 00201280

(51) Int. Cl.$^7$ .............................................. H01M 10/46
(52) U.S. Cl. ....................................................... 320/132
(58) Field of Search ................................ 320/127, 132, 320/135, 161

(56) References Cited

FOREIGN PATENT DOCUMENTS

EP          0605438          7/1994

OTHER PUBLICATIONS

International Search Report, Sep. 21, 2001.*

* cited by examiner

*Primary Examiner*—Edward H. Tso
(74) *Attorney, Agent, or Firm*—Ernestine C. Bartlett

(57) ABSTRACT

A battery-powered apparatus is provided having a battery ($B_1$), detection means ($IC_1$) for detecting a discharge condition of the battery, and signaling means (D) for indicating the discharge condition of the battery, as well as discharge means ($R_5$, $T_1$) which are activated by the detection means when a predetermined first discharge condition of the battery is reached, in order to discharge the battery in a controlled manner until a predetermined second discharge condition of the battery has been reached.

44 Claims, 2 Drawing Sheets

US 6,459,240 B2

BATTERY-POWERED APPARATUS HAVING DETECTION MEANS FOR THE DISCHARGE CONDITION OF THE BATTERY

FIELD OF THE INVENTION

The invention relates to a battery-powered apparatus for the consumer-product market having a drive motor, a battery, detecting means for detecting the discharge condition of the battery, and signaling means.

BACKGROUND OF THE INVENTION

Such an apparatus is known from European patent 0605438. Said document describes a battery-powered electric shaver which is configured in such a manner that after a predetermined discharge condition of the battery is reached a battery capacity indicator device is set to zero and the speed of rotation of the drive motor is reduced to zero continuously or in steps. The controlled reduction of the speed of rotation of the motor prevents the battery from being discharged too far and also prevents the shaver from getting stuck in the beard during a shaving session.

A drawback of the known apparatus is that the motor speed is reduced comparatively rapidly to warn the user that the battery is empty. This means that, as a rule, a shaving session which is already in progress cannot be finished, even in the case that the battery in fact contains enough charge to finish the shaving session.

Obviously, it is inconvenient for a user if a shaving session, once it has begun, cannot be completed. Since the user has not been given an indication that the shaver will be turned off as a result of the diminished charge of the battery, the user will be taken aback by the involuntary termination of the shaving session or, if the user has already experienced this before, he will tend to recharge the battery sooner than actually necessary. This may result in damage to the battery.

Consequently, there is a need for an improved method, which is experienced as reliable by the user, for the controlled turn-off of a battery-powered apparatus after a predetermined charge condition of the battery has been reached.

SUMMARY OF THE INVENTION

In order to achieve this, in accordance with the invention, a battery-powered apparatus of the type defined in the opening paragraph is characterized by discharge means which, when a predetermined first discharge condition of the battery is reached, are activated by the detection means to discharge the battery in a controlled manner until a predetermined second discharge condition of the battery is reached.

BRIEF DESCRIPTION OF THE DRAWINGS

The invention will be described in more detail hereinafter with reference to the accompanying drawings.

DETAILED DESCRIPTION OF PREFERRED EMBODIMENTS

Figure 1:
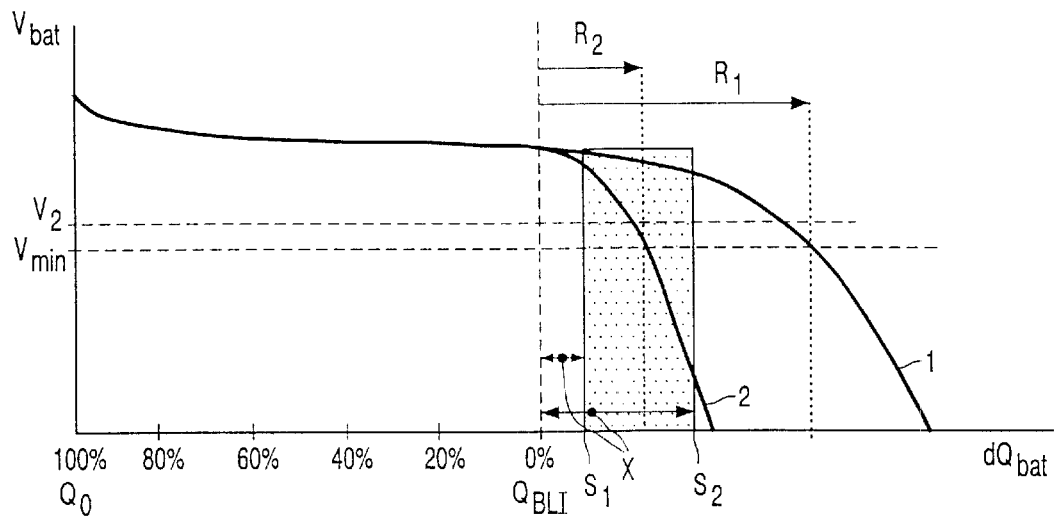
FIG. 1 shows by way of example two battery discharge curves and illustrates a first example of controlling the discharge means.
Figure 2:
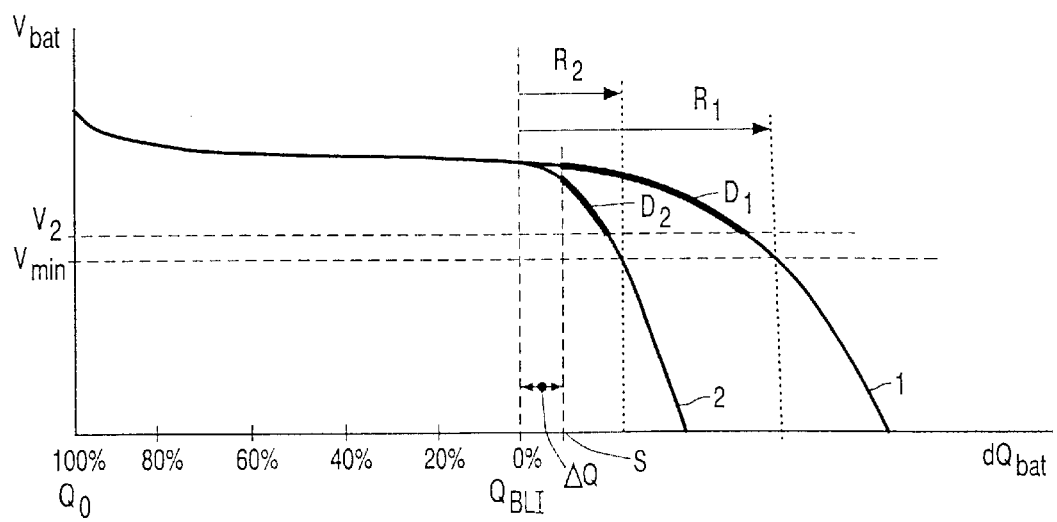
FIG. 2 shows, in a manner similar to FIG. 1, a second example of controlling the discharge means.
Figure 3:
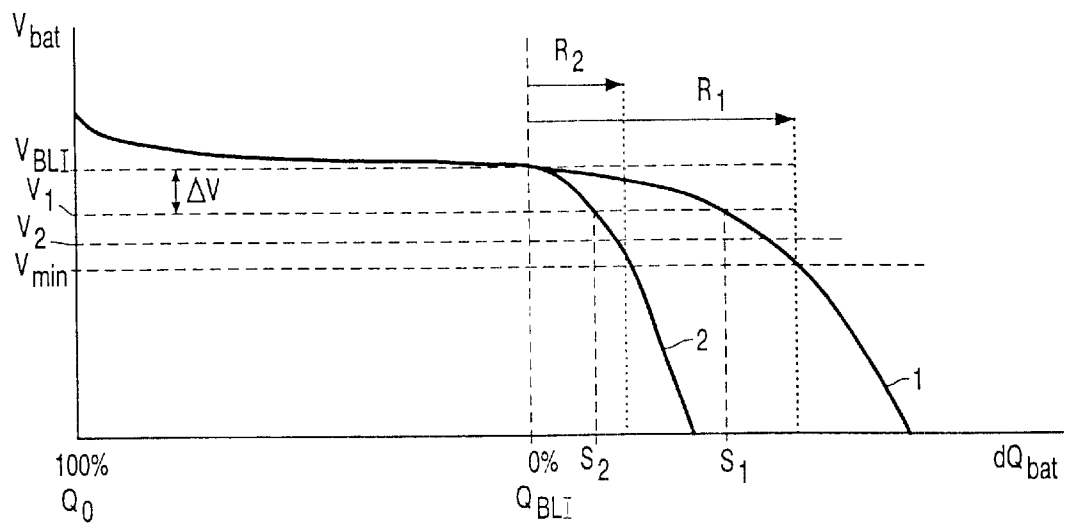
FIG. 3 shows, in a manner similar to FIG. 1 and FIG. 2, a third example of controlling the discharge means.

FIGS. 1, 2 and 3 each show an example of two battery discharge curves 1 and 2. Hereinafter, the term "battery" is to be understood to mean a "storage battery".

The curves represent the battery voltage $V_{bat}$ plotted against the consumed battery charge dQ. $dQ_{bat}$ is determined by the product of discharge current and time (I×t). A range from 100% to 0% is plotted on the horizontal axis. This range represents the minimum guaranteed battery capacity. In the discharge condition $Q_0$ the battery is fully charged and the voltage $V_{bat}$ is maximal.

In the discharge condition $Q_{BLI}$ the guaranteed period of use has elapsed, or the minimum guaranteed battery capacity has been used. At this instant there is still a certain residual capacity, but this capacity may vary from one battery to another. In the example shown in FIGS. 1, 2 and 3 the battery of curve 1 in the discharge condition $Q_{BLI}$ has a higher residual capacity than the battery of curve 2. However, within their life span in the discharge condition $Q_{BLI}$ all the batteries still have enough residual capacity to sustain the operation of the apparatus being driven until the battery voltage has decreased to $V_{min}$. The discharge condition $Q_{BLI}$ is also the condition in which the apparatus produces a BLI signal, provided that the apparatus features such a signaling. BLI means "Battery Low Indication". The BLI signal can be given by means of a display, LEDs or a buzzer.

The BLI signal indicates that the battery should be charged. However, at this instant the battery is not yet completely drained and, in the case of a shaver, it can still be used for a number of shaving sessions. However, it is not possible to predict how many shaving sessions are still available after the BLI signal.

Since the amount of residual charge may be a substantial part of the overall capacity of the battery, which will appear non-realistic to the user, the battery will be discharged in a controlled manner some time after the BLI signal. Thus, the residual capacity is effectively limited to a predetermined maximum for the user. Discharging is effected at such a rate that the battery is almost drained for the next shaving session, which is usually 24 hours later. This means that the battery voltage has decreased to a value $V_2$ which is still slightly above the minimum operating voltage $V_{min}$. The instant at which the controlled discharge is started can be determined in various manners, as will be described in greater detail hereinafter.

In all cases the controlled discharge proceeds until the level $V_2$ is reached. Preferably, the level $V_2$ is selected in such a manner that the apparatus still functions but it is apparent to the user that during subsequent use, for example during a following shaving session, it is very likely that the apparatus will no longer operate correctly. For a shaver this means that the discharge process is preferably shorter than 24 hours.

In FIGS. 1, 2 and 3 arrows $R_1$ and $R_2$ the residual capacities available after the BLI signal for the batteries of the curves 1 and 2. It is assumed here that the level $V_{min}$ has been reached.

Figure 4:
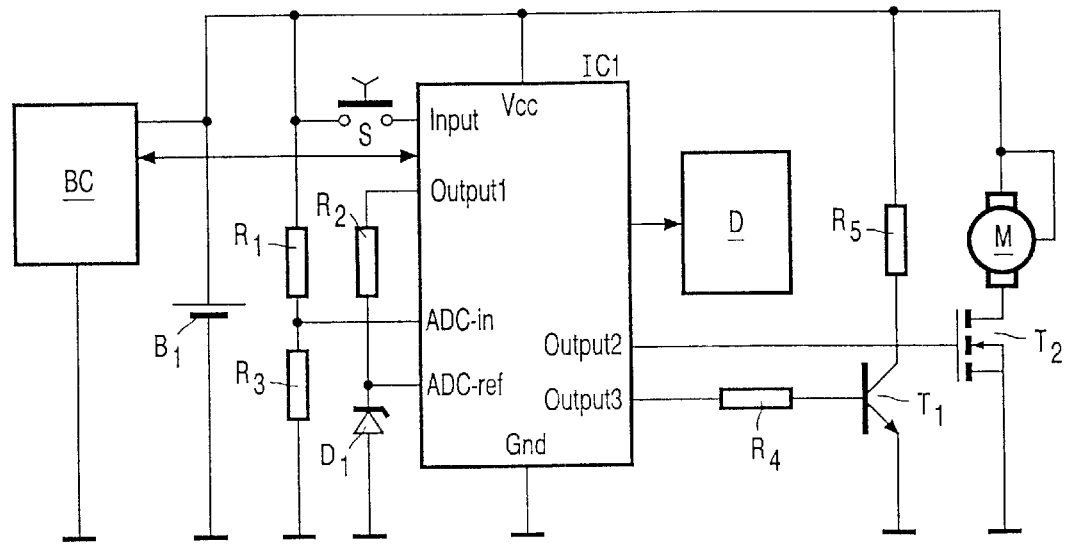
FIG. 4 is a circuit diagram of an example of an electrical circuit by means of which the invention can be realized.

FIG. 4 shows an example of an electronic circuit which is capable of realizing the method of controlled battery discharging as described above. The battery is referenced $B_1$. The battery provides both the power supply to the motor M and the power supply to the electronic circuit. The circuit includes an on/off switch S, which, via an integrated circuit $IC_1$, which may be for example a microcontroller, can turn on and turn off a transistor $T_2$, for example a MOSFET, arranged in series with the motor M and can thus turn on and turn off the motor M.

The circuit $IC_1$ measures the battery voltage via a voltage divider with resistors $R_1$, $R_3$, the tap between $R_1$ and $R_3$ being connected to the input ADC-in of an analog-to-digital converter in the circuit $IC_1$. A zener diode $D_1$ is connected to an input ADC-reference of the circuit $IC_1$ and to a current limiting resistor $R_2$. The zener diode $D_1$ supplies a reference voltage for the analog-to-digital converter of the circuit $IC_1$.

In the present example the circuit $IC_1$ is further connected to an optional signaling device D, which can produce for example an optical or acoustic BLI signal which is perceptible to the user. A vibratory alarm is also possible. A battery charger is referenced BC. Furthermore, a discharging circuit, which can be switched on by the circuit $IC_1$, is shown, which discharging circuit includes a transistor $T_1$, a base resistor $R_4$ between an output of the $IC_1$ and the base of the transistor $T_1$, and a collector resistor $R_5$. If desired, the resistor $R_4$ and the transistor $T_1$ may be included in the integrated circuit $IC_1$. As will be apparent from the foregoing, the circuit $IC_1$ is configured to actuate the signaling device D so as to produce a BLI signal when the BLI point is reached. For this purpose, the BLI point can be determined in any known and/or suitable manner. For example, the BLI point may be defined as the instant at which a minimum guaranteed period of use has elapsed. Another possibility is to define the BLI point as the instant at which the minimum guaranteed charge of the battery has been used up. When the BLI point determined as described or in another manner is reached a controlled discharge process in accordance with the invention is initiated, the discharging circuit being switched on in that the transistor $T_1$ is driven into conduction. As already stated, the starting point of the discharge process is preferably situated some time after the appearance of the BLI signal, in such a manner that the user is warned in due time that the battery will be run-down in the near future.

The starting point of the controlled discharge can be determined in various manners. For example, discharging may be started upon expiry of a predetermined time after the BLI point. FIG. 1 illustrates a method in which the respective starting instant S1 or S2 is situated a number of periods of use, i.e. a predetermined number of shaving sessions in the case of a shaver, after the BLI point. In the present context a shaving session is to be understood to mean any sequence in which the apparatus is turned on/off one or more times within a predetermined period, for example half an hour. The number of shaving sessions is represented by X in FIG. 1. X may be, for example, 2.

Since the charge consumed in a shaving session may vary from one shaving session to another and also from one person to another the position of the starting point after the controlled discharge may also vary. FIG. 1 shows two possible starting points S1 and S2. It is to be noted that it is quite well possible that in practice the X shaving sessions cannot be realized. FIG. 1 shows that in the case of a battery having a low residual capacity R2 and shaving sessions which require a comparatively large amount of charge the starting point S2 lies beyond the intersection of the characteristic 2 and the voltage level $V_{min}$.

FIG. 2 illustrates a method in which the starting point S lies at the instant at which after the BLI point a fixed predetermined amount of charge $\Delta Q$ has been consumed. The charge $\Delta Q$ could be, for example, a given percentage of the minimum guaranteed charge of the relevant battery type. The controlled discharge started at the starting point S is continued until the voltage level $V_2$ is reached. The controlled discharge ranges for the curves 1 and 2 are indicated by $D_1$ and $D_2$ in FIG. 2.

FIG. 3 illustrates a method in which the controlled discharge starts as soon as the battery voltage has decreased by a predetermined amount $\Delta V$ to a voltage $V_1$ that lies below the voltage $V_{BLI}$ at the BLI point. For a battery having a small residual capacity $R_2$ the controlled discharge starts at the point $S_2$. For a battery having a large residual capacity $R_1$ the controlled discharge begins at the point $S_1$.

When the voltage level $V_2$ is reached the transistor $T_1$ is turned off again, as a result of which the apparatus can still be used during the next period of use but it is apparent to the user that the battery should be charged. If desired, this may, for example, be emphasized by means of a special signaling feature. The signaling device could have, for example, red and green LEDs, in which case the green LEDs light up first and one or more red LEDs light up when the level $V_2$ is reached.

It is to be noted that in addition to the foregoing various modifications are conceivable. The above description is primarily aimed at the use of the invention in an electric shaver. However, the invention is likewise suitable for use in other battery-powered apparatuses. Moreover, the electronic circuit may be modified while the described functions remain the same. Furthermore, the BLI point can be determined in various known manners and there are also further possibilities of determining the start of the controlled discharge process. For example, the voltage $V_1$ in FIG. 3 could be determined on the basis of the no-load battery voltage. Such modifications are deemed to be within the scope of the invention.

What is claimed is:

1. A battery-powered apparatus having a battery, detection means for detecting a discharge condition of the battery, and signaling means for indicating the discharge condition of the battery, and discharge means which, when a predetermined first discharge condition of the battery is reached, are activated by the detection means to discharge the battery in a controlled manner until a predetermined second discharge condition of the battery is reached.

2. A battery-powered apparatus as claimed in claim 1, wherein the predetermined first discharge condition occurs in the case of a predetermined period of use after the consumption of a minimum guaranteed capacity ($Q_{BLI}$).

3. A battery-powered apparatus as claimed in claim 1, wherein the predetermined first discharge condition is reached as soon as a predetermined amount of charge ($\Delta Q$) has been consumed after the consumption of a minimum guaranteed capacity ($Q_{BLI}$).

4. A battery-powered apparatus as claimed in claim 1, wherein the predetermined first discharge condition is reached at a predetermined voltage level $V_1$ of the battery, which voltage level lies at a predetermined value $\Delta V$ below the voltage level ($V_{BLI}$) prevailing at the instant at which a minimum guaranteed capacity ($Q_{BLI}$) has been consumed.

5. A battery-powered apparatus as claimed in claim 1, wherein the predetermined first discharge condition is reached if, after the consumption of a minimum guaranteed capacity ($Q_{BLI}$), the no-load battery voltage has decreased by a predetermined value relative to the instant at which the minimum guaranteed capacity was reached.

6. A battery-powered apparatus as claimed in claim 1, wherein the predetermined second discharge condition lies at a predetermined second voltage level ($V_2$) below the voltage level for the first predetermined discharge condition.

7. A battery-powered apparatus as claimed in claim 6, wherein the second voltage level ($V_2$) lies so far above a minimum operating voltage of the apparatus that the apparatus can still function for a short time.

8. A battery-powered apparatus as claimed in claim 2, wherein the signaling means are operative to signal at least one of the following events: that the minimum guaranteed capacity has been consumed; that the predetermined first discharge condition is reached; that the predetermined second discharge condition is reached.

9. A battery-powered apparatus as claimed in claim 1 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

10. A battery-powered apparatus as claimed in claim 1, wherein the apparatus is an electric shaver and the controlled discharge takes less than 24 hours.

11. A battery-powered apparatus as claimed in claim 2 wherein the consumption of the minimum guaranteed capacity is determined by detecting the number of shaving sessions performed.

12. A battery powered apparatus as claimed in claim 11, wherein the consumption of the minimum guaranteed capacity is determined by the number of shaving sessions performed.

13. A battery-powered apparatus as claimed in claim 2, wherein the predetermined second discharge condition lies at a predetermined second voltage level ($V_2$) below the voltage level for the first predetermined discharge condition.

14. A battery-powered apparatus as claimed in claim 3, wherein the predetermined second discharge condition lies at a predetermined second voltage level ($V_2$) below the voltage level for the first predetermined discharge condition.

15. A battery-powered apparatus as claimed in claim 4, wherein the predetermined second discharge condition lies at a predetermined second voltage level ($V_2$) below the voltage level for the first predetermined discharge condition.

16. A battery-powered apparatus as claimed in claim 5, wherein the predetermined second discharge condition lies at a predetermined second voltage level ($V_2$) below the voltage level for the first predetermined discharge condition.

17. A battery-powered apparatus as claimed in claim 3, wherein the signaling means are operative to signal at least one of the following events: that the minimum guaranteed capacity has been consumed; that the predetermined first discharge condition is reached; that the predetermined second discharge condition is reached.

18. A battery-powered apparatus as claimed in claim 4, wherein the signaling means are operative to signal at least one of the following events: that the minimum guaranteed capacity has been consumed; that the predetermined first discharge condition is reached; that the predetermined second discharge condition is reached.

19. A battery-powered apparatus as claimed in claim 5, wherein the signaling means are operative to signal at least one of the following events: that the minimum guaranteed capacity has been consumed; that the predetermined first discharge condition is reached; that the predetermined second discharge condition is reached.

20. A battery-powered apparatus as claimed in claim 6, wherein the signaling means are operative to signal at least one of the following events: that the minimum guaranteed capacity has been consumed; that the predetermined first discharge condition is reached; that the predetermined second discharge condition is reached.

21. A battery-powered apparatus as claimed in claim 13, wherein the signaling means are operative to signal at least one of the following events: that the minimum guaranteed capacity has been consumed; that the predetermined first discharge condition is reached; that the predetermined second discharge condition is reached.

22. A battery-powered apparatus as claimed in claim 14, wherein the signaling means are operative to signal at least one of the following events: that the minimum guaranteed capacity has been consumed; that the predetermined first discharge condition is reached; that the predetermined second discharge condition is reached.

23. A battery-powered apparatus as claimed in claim 15, wherein the signaling means are operative to signal at least one of the following events: that the minimum guaranteed capacity has been consumed; that the predetermined first discharge condition is reached; that the predetermined second discharge condition is reached.

24. A battery-powered apparatus as claimed in claim 16, wherein the signaling means are operative to signal at least one of the following events: that the minimum guaranteed capacity has been consumed; that the predetermined first discharge condition is reached; that the predetermined second discharge condition is reached.

25. A battery-powered apparatus as claimed in claim 2 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

26. A battery-powered apparatus as claimed in claim 3 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

27. A battery-powered apparatus as claimed in claim 4 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

28. A battery-powered apparatus as claimed in claim 5 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

29. A battery-powered apparatus as claimed in claim 6 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

30. A battery-powered apparatus as claimed in claim 7 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

31. A battery-powered apparatus as claimed in claim 8 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

32. A battery-powered apparatus as claimed in claim 13 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

33. A battery-powered apparatus as claimed in claim 14 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

34. A battery-powered apparatus as claimed in claim 15 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

35. A battery-powered apparatus as claimed in claim 16 which comprises an electronic circuit arrangement including a detection circuit for detecting that the first and the second predetermined discharge condition are reached, and including a discharging circuit for discharging the battery, which discharging circuit is activated when the first discharge condition is reached and is deactivated when the second discharge condition is reached.

36. A battery-powered apparatus as claimed in claim 2, wherein the apparatus is an electric shaver and the controlled discharge takes less than 24 hours.

37. A battery-powered apparatus as claimed in claim 3, wherein the apparatus is an electric shaver and the controlled discharge takes less than 24 hours.

38. A battery-powered apparatus as claimed in claim 4, wherein the apparatus is an electric shaver and the controlled discharge takes less than 24 hours.

39. A battery-powered apparatus as claimed in claim 5, wherein the apparatus is an electric shaver and the controlled discharge takes less than 24 hours.

40. A battery-powered apparatus as claimed in claim 6, wherein the apparatus is an electric shaver and the controlled discharge takes less than 24 hours.

41. A battery-powered apparatus as claimed in claim 7, wherein the apparatus is an electric shaver and the controlled discharge takes less than 24 hours.

42. A battery-powered apparatus as claimed in claim 8, wherein the apparatus is an electric shaver and the controlled discharge takes less than 24 hours.

43. A battery-powered apparatus as claimed in claim 9, wherein the apparatus is an electric shaver and the controlled discharge takes less than 24 hours.

44. A battery-powered apparatus as claimed in claim 10 wherein the consumption of the minimum guaranteed capacity is determined by detecting the number of shaving sessions performed.

* * * * *